Aug. 12, 1969         R. H. PREISER ET AL         3,460,388
                            HYGROMETER
Filed April 3, 1967                              3 Sheets-Sheet 1

INVENTORS
RALPH H. PREISER
CLARENCE J. GOODWIN
FRANK W. EMERSON
STANLEY C. METCALF
by: Wolfe, Hubbard, Voit & Osann
                    ATTYS.

Aug. 12, 1969    R. H. PREISER ET AL    3,460,388
HYGROMETER
Filed April 3, 1967    3 Sheets-Sheet 2

INVENTORS
RALPH H. PREISER
CLARENCE J. GOODWIN
FRANK W. EMERSON
STANLEY C. METCALF
by: Wolfe, Hubbard, Voit & Osann
ATTYS.

United States Patent Office 3,460,388
Patented Aug. 12, 1969

1

3,460,388
HYGROMETER
Ralph H. Preiser and Clarence J. Goodwin, Peru, Ill., and Frank W. Emerson and Stanley C. Metcalf, Peterborough, Ontario, Canada, assignors to General Time Corporation, Stamford, Conn., a corporation of Delaware
Filed Apr. 3, 1967, Ser. No. 628,166
Int. Cl. G01n 25/56
U.S. Cl. 73—337.5     8 Claims

ABSTRACT OF THE DISCLOSURE

A hygrometer or humidity sensing device which provides a continuous indication of relative humidity over a specified range. The humidity sensing element is a closed loop of moisture responsive film, such as nylon-6, having one end fixed and the other end attached to a movable output assembly. The humidity sensing element varies in length as a nonlinear function of relative humidity, and a compensating cam is included in the output assembly and acts directly on the sensing film to convert the nonlinear elongation characteristic of the moisture sensing element to a linear output characteristic in the form of mechanical displacement of the output assembly. A regulating device is provided for varying the fixed end of the sensing element for zeroing the humidity indicating pointer on a calibrated scale.

---

The present invention relates generally to hygrometers or humidity sensing devices and, more particularly, to an improved hygrometer of the type that provides a continuous indication of relative humidity over a specified range.

It is a primary object of this invention to provide an improved hygrometer which utilizes a single compensating member to produce a continuous humidity-indicating output that varies as a substantially linear function of the sensed humidity. A related object of the invention is to provide such a hygrometer which is capable of providing a continuous indication of the sensed humidity on a linearly calibrated scale.

Another object of the present invention is to provide an improved hygrometer of the type described above which utilizes a sensing element that varies as a nonlinear function of humidity, and yet produces an output that varies in substantially direct proportion to the sensed humidity over a specified range by the use of a single compensating member. In this connection, it is still another object of the invention to provide such a hygrometer in which the single compensating member continuously and automatically compensates for the nonlinear characteristic of the sensing element to provide a linear output characteristic.

It is a further object of this invention to provide an improved hygrometer of the foregoing type which can be readily modified to provide a linear output characteristic for practically any desired length of calibrated scale. More particularly, it is an object of the invention to provide a hygrometer which is capable of providing a linear output for a 120° scale, a 180° scale, a 270° scale, or even a 360° scale by making only a minor modification of the output assembly.

Still another object of the present invention is to provide an improved hygrometer of the type described above that can be economically manufactured from a few low cost parts. A related object is to provide such a hygrometer which can be manufactured at high production rates with a high degree of reliability and reproducibility.

Other objects and advantages of the invention will become apparent upon reading the following detailed description and upon reference to the drawings, in which.

While the invention will be described in connection with certain preferred embodiments, it will be understood that it is not intended to limit the invention to these particular embodiments. On the contrary, it is intended to cover all alternatives, modifications, and equivalents as may be included within the spirit and scope of the invention as defined by the appended claims.

Figure 1:
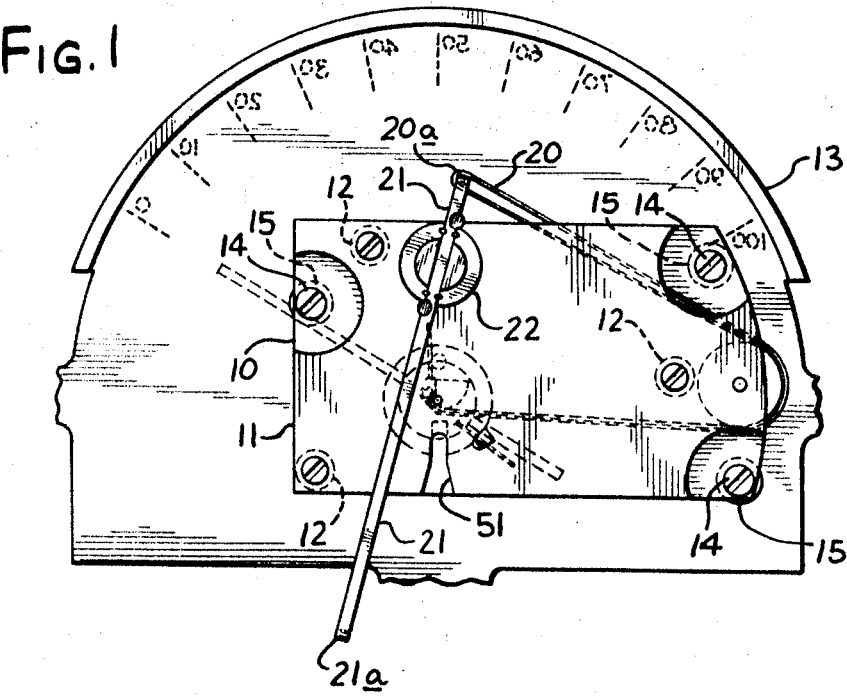
FIGURE 1 is a rear plan view of a hygrometer embodying the present invention, with the outside casing removed to reveal the internal structure.
Figure 2:
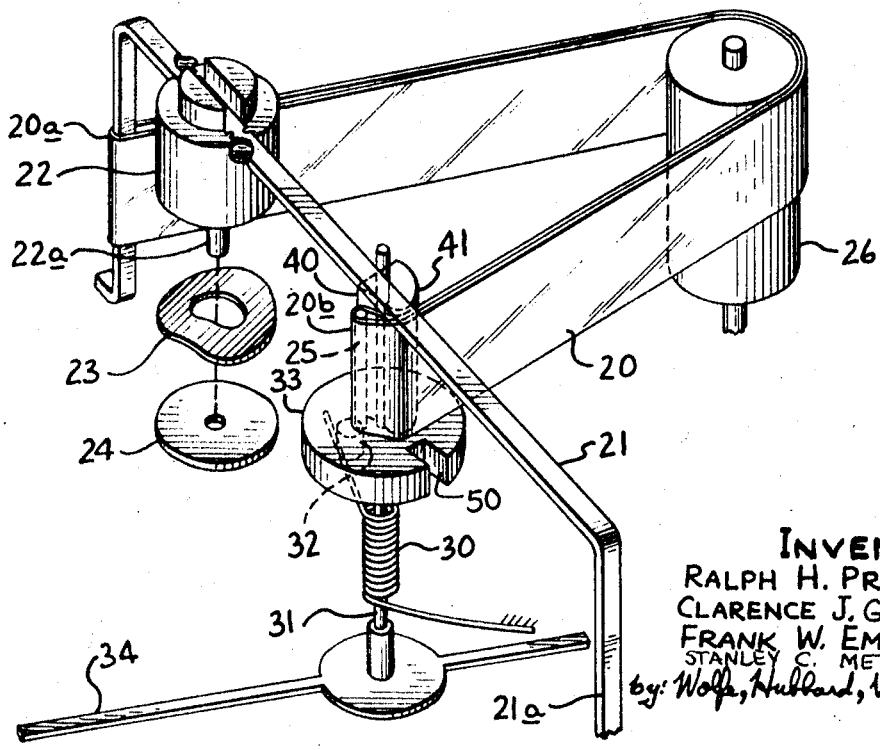
FIG. 2 is a perspective view of the humidity sensing and indicating mechanism in the hygrometer of FIGURE 1, with the supporting frame structure removed for clarity.

Turning now to the drawings and referring first to FIGURES 1 and 2, there is shown the humidity sensing and indicating mechanism of a hygrometer with its casing removed. The sensing and control elements are mounted on a pair of frame plates 10 and 11 which are held in fixed spaced apart relationship by a plurality of spacer posts 12 formed as an integral part of the forward plate 10 and receiving screws 12a threaded into the posts from the back side of the rear plate 11. The forward frame plate 10 is mounted on the back of a dial plate 13 by means of a plurality of screws 14 threaded into corresponding bosses 15 formed as an integral part of the dial plate 13.

A moisture responsive sensing element 20 is disposed between the two frame plates 10 and 11 and is fixed at one end 20a to a bent leg on the upper end of a regulating lever 21. To permit manual adjustment of the fixed end 20a of the sensing element, the lever 21 is staked in a slot formed in a rotatable regulating stud 22 journaled on the back side of the rear frame plate 11. An integral stub shaft 22a on the stud 22 extends through and slidably beyond the front side of the plate 11, where a spring washer 23 is fitted over the head of the stub shaft and held in place against the front side of the plate 11 by means of a rigid disc 24 to the end of the stub shaft. Consequently, the regulating stud 22 is biased firmly against the frame plate 11 so that the regulating lever 21 is held firmly in place by friction between the end of the pillar and the plate 11, and yet the stud 22 can be rotated by manual movement of the lever 21 to adjust the fixed end 20a of the sensing element. To facilitate manual movement of the lever 21 to adjust the fixed end 20a of the sensing element 20, the lower arm of the lever extends down to the bottom of the dial plate 13 where a leg 21a projects forwardly beneath the dial plate 13 so that it is accessible to an operator in front of the dial. If desired, a small knob may be placed on the forward end of the leg 21a to further facilitate adjustment. Because of the relatively long lever arm between the stud 22 and the leg 21a, only a small manual force is required to adjust the position of the fixed end 20a of the sensing element. As will be apparent from the ensuing description, the primary purpose of this adjustment feature is to permit the humidity indicator to be "zeroed" on the calibrated scale on the front of the dial plate 13 (illustrated in broken lines in FIGURE 1).

Figure 6:
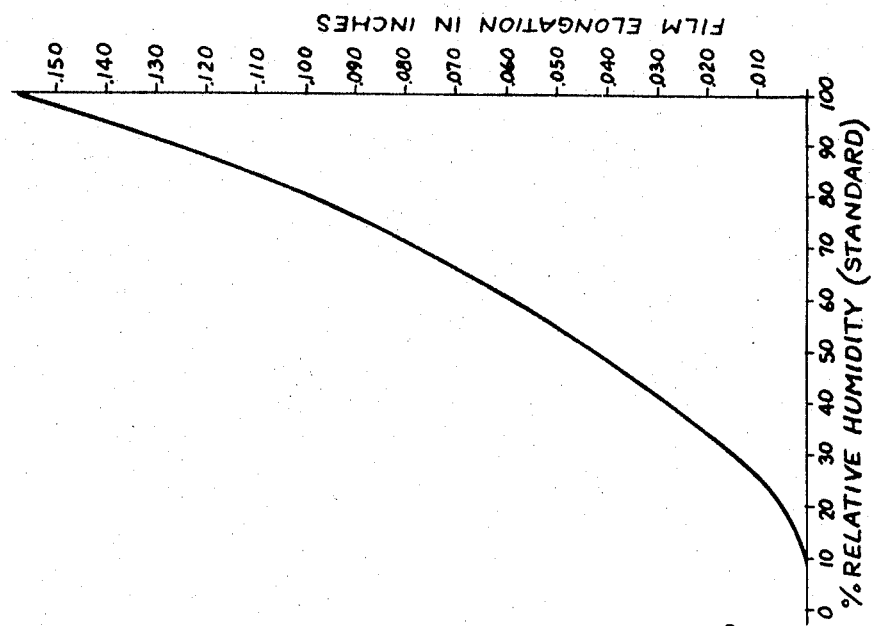
FIG. 6 is a graph showing the variation in length of the sensing element in the hygrometer of FIGURE 1 as a function of the relative humidity.

The sensing element 20 in the illustrative hygrometer may be made of any of a number of different materials which change in length as a non-linear function of the humidity in the ambient air. The preferred material for the sensing element is commonly known as nylon-6, which is a condensation product of 1,6-hexanediamine and adipic acid. The longitudinal growth characteristic of a six-inch strip of nylon-6 film as a function of relative humidity is illustrated in FIGURE 6, and will be discussed in more detail below.

In accordance with one aspect of the present invention, the moisture responsive sensing element 20 is in the form of a closed loop of film, one end of which is looped around an adjustable fixed point, while the other end is secured to a movable output assembly. Thus, in the illustrative embodiment, the sensing element 20 is in the form of a closed loop of nylon-6 film having a fixed end 20a formed by looping around the upper leg on the regulating lever 21, and a movable end 20b looped around a pin 25 included in the output assembly. It will be appreciated that the closed loop construction of the sensing element not only facilitates assembly of the instrument, but is also more accurate because it eliminates the possibility of varying the two end points during manufacture of the instrument, such as might occur when the two end points are determined by clamping two free ends of a sensing element. The mid-portion of the sensing film is doubled around an idler roller 25 journaled between the two frame plates, 10, 11, at a point spaced away from the two end points 20a and 20b so that the overall configuration of the sensing film 20 is generally V-shaped (see FIGS. 1 and 2). This enables the sensing element to be accommodated in a structure considerably shorter than the length of the film strip. If desired, additional idler rollers could be provided, to form an S-shaped film path for example, but it is desired to keep the frictional load imposed on the sensing film by such rollers to a minimum.

As the humidity in the ambient air increases, the length of the sensing film 20 also increases so as to permit advancing movement of the output assembly which carries the film pin 25. In the illustrative embodiment, such advancing movement is effected by a biasing spring 30 coiled around a shaft 31 and fixed at one end to the forward frame plate 10. The other end of the biasing spring 30 engages a lug 32 formed on the forward side of an output disc 33 which is fixed to the shaft 31 and carries the film pin 25. The spring 30 thus urges the disc 33 in a clockwise direction as viewed in FIGURE 2 so as to tension the sensing film 20. Consequently, as the sensing film 20 elongates in response to increasing humidity, the biasing spring 30 rotates the disc 33 and the output shaft 31 fixed thereto, in a clockwise direction (as viewed in FIGS. 1 and 2) while maintaining the sensing film under tension. Conversely, when the sensing film 20 shrinks in response to decreasing humidity, it rotates the disc 33 and shaft 31 against the bias of the spring 30 in a counter-clockwise direction (as viewed in FIGS. 1 and 2), while the spring 30 still maintains the film 20 under tension.

In order to provide a visible indication of the angular movement of the output assembly due to variations in the length of the sensing film, a pointer 34 is mounted on the forward end of the output shaft 31 on the front side of the dial plate 13. This pointer 34 cooperates with a calibrated dial indicated in broken lines (FIGURE 1) on the front of the plate 13 so as to provide a continuous direct reading of the relative humidity sensed by the film 20. As mentioned previously, the pointer 34 may be "zeroed" on the calibrated dial by adjusting the fixed end 20a of the sensing film via the regulating lever 21.

Figure 3:
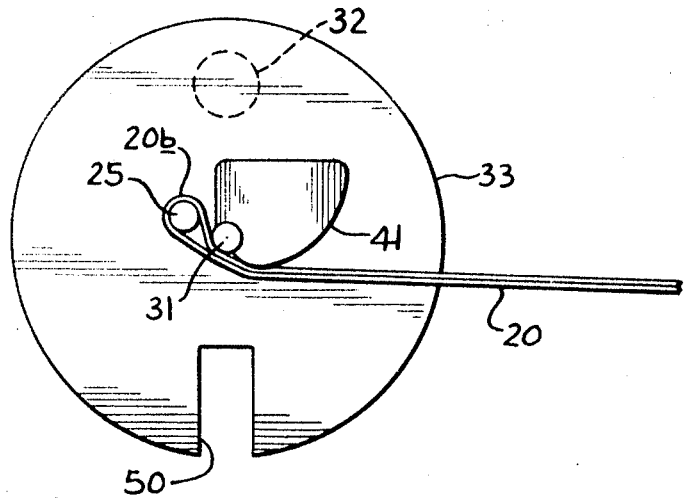
FIG. 3 is an enlarged top plan view of the output assembly in the humidity sensing and indicating mechanism in the hygrometer of FIGURE 1.
Figure 4:
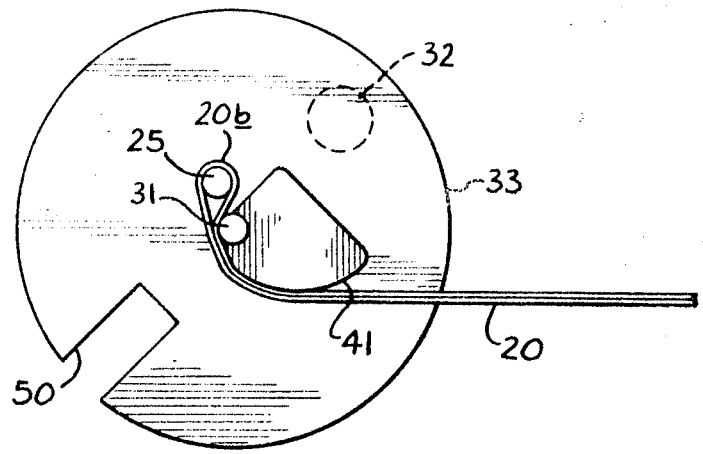
FIG. 4 is a plan view of the same structure shown in FIGURE 3 but displaced 45° from the position in FIGURE 3 so as to represent a different humidity level.
Figure 5:
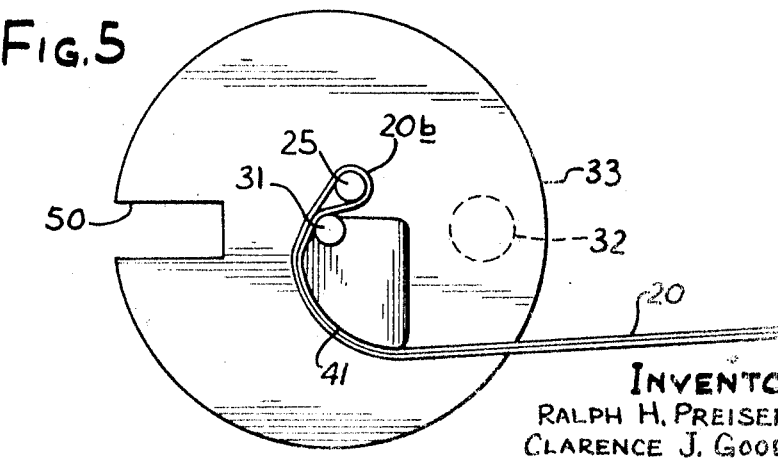
FIG. 5 is a plan view of the same structure shown in FIGURE 3 but displaced 90° from the position in FIGURE 3 so as to represent a different humidity level.

In accordance with an important aspect of this invention, a compensating cam is operatively associated with the output assembly and acts directly on the sensing element for providing an output assembly displacement which varies in direct proportion to the variations in relative humidity. In other words, the compensating cam continually responds to displacement of the output assembly to act directly on the sensing element so as to compensate for the nonlinear elongation characteristic of the sensing element 20 to provide a linear output characteristic, thereby permitting the use of a linearly calibrated scale on the dial where the relative humidity readings are made. In the illustrative embodiment, a compensating cam 40 is mounted on the output disc 33 directly adjacent the shaft 31 and defining a cam surface 41 which bears against the sensing film 20. As can be seen most clearly in the sequential plan views of FIGURES 3 through 5 (illustrating the position of the output assembly at three different humidity levels), the compensating cam 40 is responsive to angular displacement of the output assembly for acting directly on the sensing film 20 to cam the film away from the center of the output assembly as the length of the film increases with increasing humidity and, conversely, to permit the sensing film to retract toward the center of the output assembly as the length of the film decreases with decreasing humidity. Thus, the cam 40 effectively widens the V formed by the sensing film 20 as the humidity increases, and narrows the V as the humidity decreases. Consequently, it can be seen that the cam surface 41 has the effect of increasing the distance which must be spanned by the film between the idler roller 26 and the zero position of the film pin 25 as the film is elongated, so that only a portion of the total elongation is converted into angular displacement of the output assembly. The exact percentage of the film elongation that is converted into angular displacement of the output assembly at any given film length is determined by the shape of the cam surface 41, which is designed to compensate for the nonlinearity in the film elongation characteristic.

Figure 7:
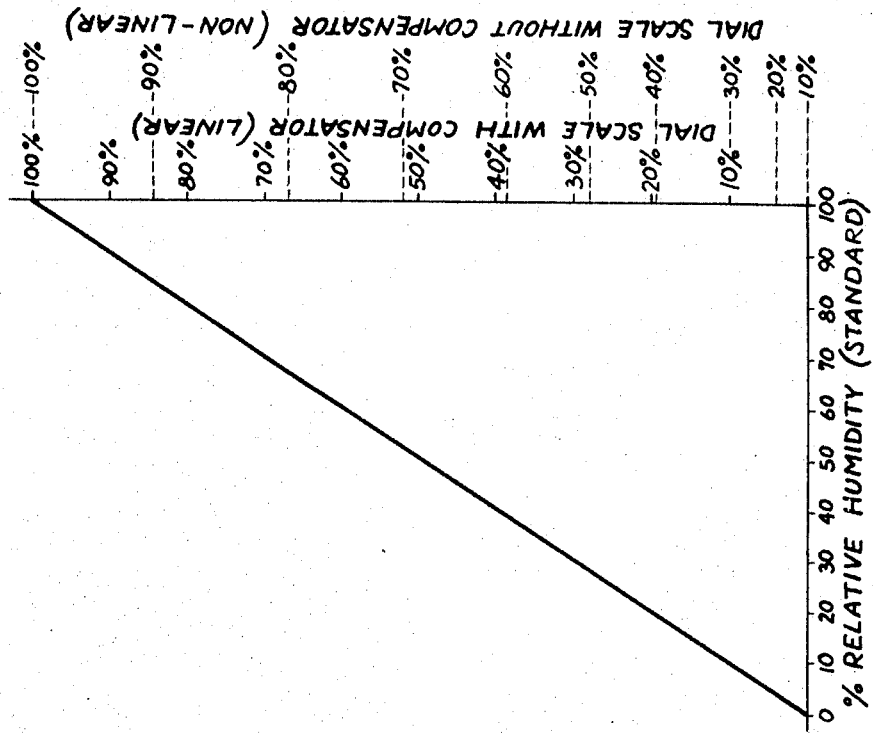
FIG. 7 is a graph showing calibrated relative humidity scales for a hygrometer utilizing the sensing element of FIGURE 6, both with and without the present invention, as a function of actual relative humidity.

The compensating effect of the cam 40 will be more clearly understood by reference to FIGURES 6 and 7. FIG. 6 is a graph showing the variation in length of a six-inch length (3 inches between ends of closed loop) of nylon-6 film as a function of relative humidity causing the elongation. It can be seen that the film has a definite non-linear characteristic, i.e., the film length does not vary in direct proportion to the variations in relative humidity. More particularly, the film becomes increasingly responsive to changes in humidity as the relative humidity increases from 0 to 100.

The effect of the compensating cam 40 is illustrated in FIG. 7, which is a graph showing the calibrated scales required on the dial of a hygrometer utilizing a sensing element having the characteristic illustrated in FIG. 6, with and without the compensating cam. Thus, the right-hand scale along the vertical axis in FIG. 7 is the scale required without the compensating cam, i.e., where the displacement of the output assembly varies in direct proportion to the variations in film length; it can be seen that this scale is nonlinear, because of the nonlinear elongation characteristic of the sensing film, and is much more confusing to read than a linearly calibrated scale. With the addition of the compensating cam 40, the lefthand scale along the vertical axis in FIG. 7 can be used; this is a linear scale because the compensator provides an output displacement which varies in direct proportion to the variations in relative humidty, as indicated by the straight-line output characteristic in FIG. 7. The linear scale is, of course, much easier to read than the nonlinear scale required without the compensator.

In the illustrative hygrometer described thus far, the output assembly, including the compensating cam 40, is designed to provide an output displacement of 120° over the full 0 to 100% range of relative humidity, i.e., the pointer 34 swings through an arc of 120° between 0 and 100% relative humidity. A significant feature of this invention is that the output displacement may be readily changed by making only a minor modification in the output assembly. For example, the 120° displacement provided by the illustrative unit may be increased or decreased by simply connecting a pair of gears between the output shaft 31 and the shaft of the pointer 34, with an appropriate gear ratio to provide the desired increase or decrease in the displacement of the pointer 34. Alternatively, different output displacements can be achieved by simply substituting different compensating cams 40 designed to provide different total angular displacements of the output assembly while still effecting the desired compensation. In this connection, it should be noted that if the angular displacement of the output assembly is increased to the point where the film pin 25 is rotated so far that it comes into contact with the main body portion of the film 20, the pin 25 may itself form a part of the compensating cam surface. It will be apparent that a wide variety of different camming devices may be utilized to effect the desired compensation in accordance with the teachings of this invention.

As a further feature of this invention, means are provided for initially keying the output assembly at a predetermined position corresponding to a given humidity level so that the cam 40 and the sensing film 20 are in exactly the required relative position. Thus, in the illustrative instrument, a keying slot 50 is formed in the periphery of the output disc 33 for registration with a corresponding slot 51 formed in the rear frame plate 11. During assembly of the unit, an appropriate tool is inserted into the frame slot 51 and the output assembly rotated until the tool slips into the disc slot 50, thereby indicating that the two slots are in register and holding the output assembly in that position. After the assembly has been completed, the registering tool is removed. This feature assures accurate reproducibility of the hygrometers regardless of the production volume.

As can be seen from the foregoing detailed description, the present invention provides an improved hygrometer which provides a continuous indication of relative humidity on a linearly calibrated scale by the use of a single compensating cam acting directly on a sensing element that varies as a nonlinear function of humidity. The compensating cam continually responds to displacement of the output assembly to continuously and automatically compensate for the nonlinear characteristic of the sensing element by acting directly on the sensing element. Consequently, the improved hygrometer provided by this invention achieves significantly improved accuracy and reliability by the use of a single compensating member which can be readily changed to provide different output displacements as required by different instrument arrangements or dials. The closed loop construction of the sensing film greatly facilitates assembly of the hygrometer and insures a high degree of reliability and reproducibility for high volume production. In addition, the keying slots in the output assembly and the frame plate permit rapid and accurate alignment of each instrument, thereby further enhancing the accuracy and reproducibility of the instrument even at high production rates.

We claim:

1. An improved hygrometer comprising the combination of a humidity sensing element made of a material which changes in length as a nonlinear function of the humidity to which it is exposed, means connected to a first point on said sensing element for holding said first point in a fixed position, tensioning means connected to a second point on said sesing element spaced longitudinally away from said first point for permitting movement of said second point in response to changes in the length of said sensing element while maintaining the sensing elemet under tension, a single unitary output means connected directly to said sensing element to have movement in direct response to movement of said second point, an indicator connected directly to said single unitary output means to indicate changes in the humidity sensed by said element, and a single compensating element in direct engagement with said sensing element and connected to said output means for responding to displacement of said output means to convert the non-linear variations in the length of said sensing element to linear displacement of said output means and indicator.

2. An improved hygrometer comprising the combination of a humidity sensing element made of a material which changes in length as a nonlinear function of the humidity to which it is exposed, means connected to a first point on said sensing element for holding said first point in a fixed position, tensioning means connected to a second point on said sensing element spaced longitudinally away from said first point for permitting movement of said second point in response to changes in the length of said sensing element while maintaining the sensing element under tension, output means adapted to be displaced in response to movement of said second point to indicate changes in the humidity sensed by said element, and compensating means in direct engagement with said sensing element and operatively associated with said output means for responding to displacement of said output means to convert the nonlinear variations in the length of said sensing element to linear displacement of said output means, said compensating means comprising a single cam mounted on said output means and in direct bearing engagement with said sensing element.

3. An improved hygrometer comprising the combination of a humidity sensing element made of a material which changes in length as a nonlinear function of the humidity to which it is exposed, means connected to a first point on said sensing element for holding said first point in a fixed position, tensioning means connected to a second point on said sensing element spaced longitudinally away from said first point for permitting movement of said second point in response to changes in the length of said sensing element while maintaining the sensing element under tension, output means adapted to be displaced in response to movement of said second point to indicate changes in the humidity sensed by said element, and compensating means in direct engagement with said sensing element and operatively associated with said output means for responding to displacement of said output means to convert the non-linear variations in the length of said sensing element to linear displacement of said output means, said output means including means for registering said output means and said compensating means with a fixed portion of the hygrometer for aligning said output means and said compensating means at a predetermined position relative to said sensing element.

4. An improved hygrometer comprising the combination of a humidity sensing element made of a material which changes in length as a nonlinear function of the humidity to which it is exposed, means connected to a first point on said sensing element for holding said first point in a fixed position, tensioning means connected to a second point on said sensing element spaced longitudinally away from said first point for permitting movement of said second point in response to changes in the length of said sensing element while maintaining the sensing element under tension, output means adapted to be displaced in response to movement of said second point to indicate changes in the humidity sensed by said element, and a compensating cam operatively associated with said output means and defining a cam surface bearing directly against said sensing element for compensating for the nonlinear variations in the length of said sensing element in response to displacement of said output means so that the displacement of said output means is a substantially linear function of the relative humidity sensed by the sensing element.

5. An improved hygrometer as set forth in claim 4 in which said humidity sensing element is in the form of a closed loop of moisture sensitive film, and including first mounting means adapted to have one end of said film looped therearound so as to hold said one end in a fixed position; second mounting means adapted to have the other end of said film looped therearound, said second mounting means being movable and including said tensioning means biasing the closed loop of film away from said fixed end, and said output means is associated with said second mounting means for displacement in response to variations in the length of said closed loop of film to indicate the relative humidity.

6. An improved hygrometer as defined in claim 4 in which said first mounting means is adjustable for adjusting the fixed end of the closed loop of film.

7. An improved hygrometer comprising the combination of a humidity sensing element made of a material which changes in length as a function of the humidity to which it is exposed, first mounting means adapted to hold one end of said sensing element in a fixed position, a regulating lever connected to said first mounting means and mounted for pivotal movement for adjusting the position of said first mounting means and thereby adjusting the fixed position of said one end of said sensing element, and output means including a second mounting means for holding the other end of said sensing element under tension while permitting movement thereof in response to variations in the length of said sensing element for indicating the relative humidity.

8. An improved hygrometer as set forth in claim 7 in which said sensing element is a closed loop of film made of a material which changes in length according to changes in humidity, said first mounting means is fitted within a first end of said closed loop for holding said first end in a fixed position, said second mounting means is fitted within a second end of said closed loop for permitting movement of said second end while tensioning the web, and said output means includes means for indicating the relative humidity as a function of the movement of said second mounting means in response to variations in the length of said closed loop of film.

References Cited
UNITED STATES PATENTS

| | | | |
|---|---|---|---|
| 2,651,941 | 9/1953 | Windsor et al. | 73—337.5 |
| 3,163,729 | 12/1964 | Flagg | 73—337.5 |
| 275,220 | 4/1883 | Klinkerfues | 73—337.5 |

LOUIS R. PRINCE, Primary Examiner

D. E. CORR, Assistant Examiner